United States Patent
Hoel et al.

(10) Patent No.: US 12,137,081 B2
(45) Date of Patent: Nov. 5, 2024

(54) RESOURCE ACCESS IN A MICROCONTROLLER

(71) Applicant: TEXAS INSTRUMENTS INCORPORATED, Dallas, TX (US)

(72) Inventors: Robin O. Hoel, Oslo (NO); Eric Peeters, Frisco, TX (US); Prithvi Shankar Yeyyadi Anantha, Bangalore (IN); Aniruddha Periyapatna Nagendra, Bangalore (IN); Shobhit Singhal, Karnataka (IN); Ruchi Shankar, Bengaluru (IN); Prachi Mishra, Ahmedabad (IN)

(73) Assignee: Texas Instruments Incorporated, Dallas, TX (US)

( * ) Notice: Subject to any disclaimer, the term of this patent is extended or adjusted under 35 U.S.C. 154(b) by 484 days.

(21) Appl. No.: 17/470,528

(22) Filed: Sep. 9, 2021

(65) Prior Publication Data

US 2023/0076376 A1 Mar. 9, 2023

(51) Int. Cl.
*H04L 9/40* (2022.01)
*G06F 13/36* (2006.01)

(52) U.S. Cl.
CPC .......... *H04L 63/029* (2013.01); *G06F 13/36* (2013.01); *G06F 2213/40* (2013.01)

(58) Field of Classification Search
CPC ... H04L 63/029; H04L 63/0263; G06F 13/36; G06F 2213/40
See application file for complete search history.

(56) References Cited

U.S. PATENT DOCUMENTS

| | | | | |
|---|---|---|---|---|
| 6,044,446 A | * | 3/2000 | Joy | ........... G06F 12/0833 711/205 |
| 6,226,372 B1 | * | 5/2001 | Beebe | ........... H04M 3/38 379/189 |
| 6,754,832 B1 | * | 6/2004 | Godwin | ........... H04L 63/0227 726/4 |
| 7,571,188 B1 | * | 8/2009 | Schwetman, Jr. | .. G06F 11/3409 |
| 7,937,755 B1 | * | 5/2011 | Guruswamy | ....... H04L 63/1416 709/224 |
| 7,945,551 B1 | * | 5/2011 | Alpern | ........... G06F 16/2471 707/706 |

(Continued)

*Primary Examiner* — Aravind K Moorthy
(74) *Attorney, Agent, or Firm* — Xianghui Huang; Frank D. Cimino

(57) ABSTRACT

A microcontroller is provided and comprises a central repository, a processing device, and a firewall. Rule repository memory in the central repository stores one or more access rules defining an access permission of a software context to one or more target resources of the microcontroller. The firewall receives a bus transaction initiated based on an instruction and determines whether any access rule stored in memory of the firewall defines the access permission of the software context to a destination resource. If no access rule stored in the firewall memory defines the access permission, the firewall communicates a miss query condition to the central repository. The central repository searches the rule repository memory for an access rule defining the access permission of the software context to the destination resource, and if a related access rule is found, the related access rule is stored in the firewall memory.

20 Claims, 5 Drawing Sheets

(56) References Cited

U.S. PATENT DOCUMENTS

| | | | | |
|---|---|---|---|---|
| 8,161,536 | B1* | 4/2012 | Subramaniam | H04L 63/0884 707/782 |
| 9,798,803 | B2* | 10/2017 | Chen | G08B 13/19615 |
| 10,152,315 | B1* | 12/2018 | Olague | G06Q 20/10 |
| 10,212,600 | B1* | 2/2019 | Mehra | H04W 8/10 |
| 10,341,298 | B1* | 7/2019 | Lichtenberg | H04L 63/0263 |
| 10,484,334 | B1* | 11/2019 | Lee | H04L 67/30 |
| 10,581,919 | B2* | 3/2020 | Kruse | H04L 63/20 |
| 10,867,039 | B2* | 12/2020 | Gordeychik | G06F 21/577 |
| 10,880,270 | B1* | 12/2020 | Rigor | H04L 63/0263 |
| 11,042,600 | B1* | 6/2021 | Murali | G06F 16/954 |
| 11,068,483 | B2* | 7/2021 | Marcel | G06F 16/24549 |
| 11,405,424 | B1* | 8/2022 | Kozlova | G06F 3/0484 |
| 11,816,103 | B1* | 11/2023 | Goel | G06F 16/24534 |
| 2002/0082817 | A1* | 6/2002 | Harriman | G06F 30/33 703/17 |
| 2002/0103987 | A1* | 8/2002 | Jaffrey | G06F 9/4411 712/32 |
| 2003/0118038 | A1* | 6/2003 | Jalava | H04L 63/20 370/402 |
| 2003/0233582 | A1* | 12/2003 | Pemmaraju | H04L 63/029 726/12 |
| 2004/0111638 | A1* | 6/2004 | Yadav | H04L 63/1458 726/23 |
| 2004/0230597 | A1* | 11/2004 | Wookey | G06F 11/008 |
| 2006/0020600 | A1* | 1/2006 | Corl | H04L 49/25 |
| 2006/0242702 | A1* | 10/2006 | McIntosh | G06F 9/30178 712/E9.055 |
| 2007/0067625 | A1* | 3/2007 | Jiang | H04L 63/10 713/168 |
| 2007/0150614 | A1* | 6/2007 | Ramachandran | H04L 63/101 709/238 |
| 2007/0186100 | A1* | 8/2007 | Wakameda | H04L 69/22 713/160 |
| 2007/0226795 | A1* | 9/2007 | Conti | G06F 21/554 726/22 |
| 2007/0282986 | A1* | 12/2007 | Childress | G06Q 10/063 709/223 |
| 2008/0229028 | A1* | 9/2008 | Cascaval | G06F 8/4442 711/141 |
| 2008/0282314 | A1* | 11/2008 | Abzarian | H04L 63/20 726/1 |
| 2011/0055777 | A1* | 3/2011 | Tremaine | G06F 11/263 716/106 |
| 2011/0064269 | A1* | 3/2011 | Pai M.M | G06F 18/24765 382/103 |
| 2011/0191366 | A1* | 8/2011 | Eustace | H04L 67/02 715/752 |
| 2012/0102543 | A1* | 4/2012 | Kohli | H04L 63/20 726/1 |
| 2012/0109940 | A1* | 5/2012 | Ishii | H04L 63/101 707/E17.014 |
| 2012/0203753 | A1* | 8/2012 | Biran | G06F 16/90344 707/706 |
| 2012/0311693 | A1* | 12/2012 | Horman | H04L 61/4511 726/14 |
| 2013/0246457 | A1* | 9/2013 | Stojancic | G06F 16/43 707/769 |
| 2013/0301641 | A1* | 11/2013 | Anand | H04L 63/0227 370/389 |
| 2014/0068747 | A1* | 3/2014 | Burchfield | H04L 63/02 726/11 |
| 2014/0189086 | A1* | 7/2014 | Chattopadhyay | H04L 41/5096 709/223 |
| 2014/0330804 | A1* | 11/2014 | Bao | G06F 16/3338 707/706 |
| 2015/0098455 | A1* | 4/2015 | Fritsch | H04L 12/2816 370/338 |
| 2015/0372994 | A1* | 12/2015 | Stuntebeck | H04W 12/02 713/156 |
| 2016/0112374 | A1* | 4/2016 | Branca | H04L 63/102 726/1 |
| 2016/0182619 | A1* | 6/2016 | Mann | H04L 43/50 709/204 |
| 2016/0266557 | A1* | 9/2016 | Zhang | G05B 15/02 |
| 2016/0335184 | A1* | 11/2016 | Leung | G06F 12/0842 |
| 2016/0337317 | A1* | 11/2016 | Hwang | H04L 41/0893 |
| 2017/0005986 | A1* | 1/2017 | Bansal | G06F 9/455 |
| 2017/0078329 | A1* | 3/2017 | Hwang | H04L 63/0263 |
| 2017/0149736 | A1* | 5/2017 | Black | H04L 63/029 |
| 2017/0289187 | A1* | 10/2017 | Noel | G06F 16/9024 |
| 2018/0007008 | A1* | 1/2018 | Bansal | G06F 12/0813 |
| 2018/0203711 | A1* | 7/2018 | Wagner | H04L 67/125 |
| 2018/0295494 | A1* | 10/2018 | Meau | H04W 8/005 |
| 2019/0124064 | A1* | 4/2019 | Kawaguchi | H04L 63/107 |
| 2019/0171582 | A1* | 6/2019 | Levy | G06F 12/126 |
| 2019/0273720 | A1* | 9/2019 | Cloud | H04L 63/0236 |
| 2019/0394167 | A1* | 12/2019 | Erickson | H04L 63/0245 |
| 2020/0067962 | A1* | 2/2020 | Tan | H04L 63/1433 |
| 2020/0210613 | A1* | 7/2020 | Carrier | G06F 16/14 |
| 2020/0245150 | A1* | 7/2020 | Zhao | H04W 12/37 |
| 2020/0322437 | A1* | 10/2020 | Mardente | H04L 67/1097 |
| 2020/0329011 | A1* | 10/2020 | Cai | H04L 41/145 |
| 2020/0349131 | A1* | 11/2020 | Suslov | H04L 41/0853 |
| 2020/0356578 | A1* | 11/2020 | Frieder | G06N 20/00 |
| 2020/0379767 | A1* | 12/2020 | McCrary | G06F 9/3838 |
| 2020/0403912 | A1* | 12/2020 | Allen | H04L 47/822 |
| 2021/0006542 | A1* | 1/2021 | Myneni | H04L 63/20 |
| 2021/0097136 | A1* | 4/2021 | Zhou | G06F 40/211 |
| 2021/0117481 | A1* | 4/2021 | Tortosa | H04L 67/10 |
| 2021/0124847 | A1* | 4/2021 | Cui | G06F 9/445 |
| 2021/0191835 | A1* | 6/2021 | Gueta | G06F 9/453 |
| 2021/0226812 | A1* | 7/2021 | Park | H04L 12/2832 |
| 2021/0273970 | A1* | 9/2021 | Alshech | H04L 63/1433 |
| 2021/0288970 | A1* | 9/2021 | Chawla | H04L 67/55 |
| 2021/0289001 | A1* | 9/2021 | Wilson | H04L 63/101 |
| 2021/0409376 | A1* | 12/2021 | Nagargoje | H04L 63/1425 |
| 2022/0060417 | A1* | 2/2022 | Kfir | H04L 45/66 |
| 2022/0283847 | A1* | 9/2022 | Persson | G06F 12/10 |
| 2022/0342769 | A1* | 10/2022 | Brenner | H04L 41/0663 |
| 2022/0368672 | A1* | 11/2022 | Velugu | H04L 63/0236 |
| 2022/0417216 | A1* | 12/2022 | Elliott | G06F 13/4282 |
| 2023/0024210 | A1* | 1/2023 | Won | G06F 16/217 |

* cited by examiner

RESOURCE ACCESS IN A MICROCONTROLLER

BACKGROUND

A microcontroller or microcontroller unit (MCU) may be designed for specific applications such as embedded applications. The microcontroller can contain a plurality of components such as one or more central processing units (CPUs) and one or more memory modules.

SUMMARY

In accordance with one aspect, a microcontroller comprises a central repository, a processing device, and a firewall. The central repository comprises rule repository memory configured to store one or more access rules defining an access permission of a software context to one or more target resources of the microcontroller. The processing device is configured to obtain an instruction of the software context and initiate a bus transaction based on the instruction. The firewall comprises firewall memory configured to store at least one access rule of the one or more access rules. The firewall is configured to receive the bus transaction from the processing device, the bus transaction comprising an operation code portion and a resource portion identifying a destination resource of the microcontroller. The firewall is also configured to determine whether any access rule stored in the firewall memory defines the access permission of the software context to the destination resource. If no access rule stored in the firewall memory defines the access permission of the software context to the destination resource, the firewall is configured to generate a miss query condition and communicate the miss query condition to the central repository. The central repository is configured to, in response to receiving the miss query condition, search the rule repository memory for an access rule of the one or more access rules defining the access permission of the software context to the destination resource and if a related access rule is found, cause the related access rule to be stored in the firewall memory.

In accordance with another aspect, a method comprises receiving an instruction of a software context at a firewall, the instruction identifying a destination resource of a microcontroller. The method also comprises querying an access rule storage location of the firewall to determine if a first access rule stored in the access rule storage location defines access to the destination resource by the instruction. If no access rule stored in the access rule storage location defines access to the destination resource by the instruction, the method comprises generating a miss query condition, transmitting the miss query condition to a central rule repository, and searching an access rule storage of the central rule repository to determine if an access rule stored in the access rule storage defines access to the destination resource by the instruction. If a second access rule stored in the access rule storage defines access to the destination resource by the instruction, the method comprises storing the second access rule in the access rule storage location.

DETAILED DESCRIPTION

Figure 1:
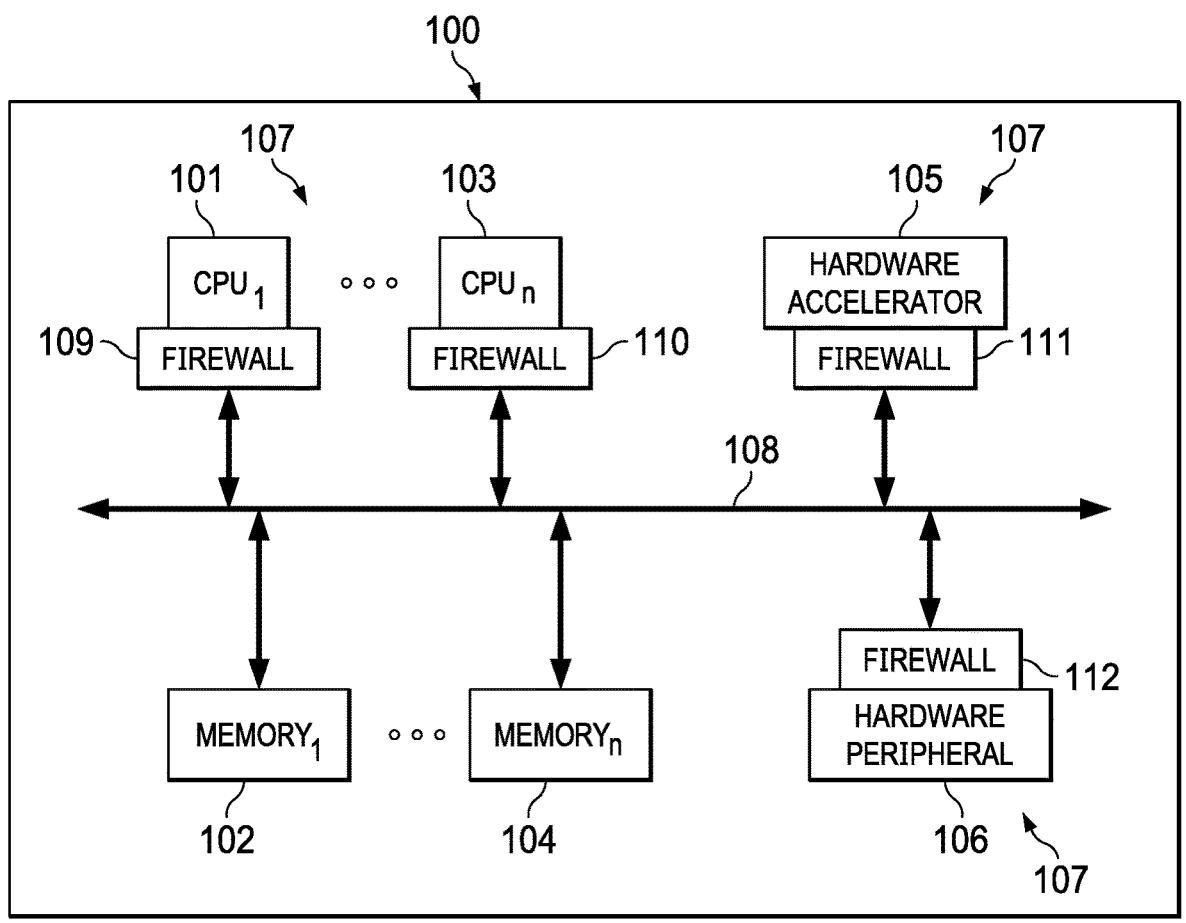
FIG. 1 is a block diagram of a microcontroller according to an aspect.

Referring to FIG. 1, a block diagram of a microcontroller 100 is shown. The microcontroller 100 includes a central processing unit (CPU) 101 and a memory module 102. As illustrated in phantom, additional CPUs 103 and/or memory modules 104 may be included in a multi-CPU application and/or a multi-memory module application. In some examples, additional components such as one or more hardware accelerator(s) 105 and one or more hardware peripheral(s) 106 may be included in the microcontroller 100. The CPUs 101, 103, the hardware accelerator 105, and the hardware peripheral 106 may be referred to herein as master components 107 of the microcontroller 100. A master component 107 is a component configured to execute instructions (e.g., of a software context or of internal programming) involving an interaction with another part of the microcontroller 100. For example, the CPU 101 may execute an instruction seeking the data stored in a target memory location of the memory module 102. An interconnect or system bus 108 connects the master components 107 and other target resources (e.g., memory modules 102, 104) of the microcontroller 100 together and allows the communication of bus controls, addresses, data, and the like to be transferred therebetween.

As illustrated, each of the CPUs 101, 103, the hardware accelerator 105, and the hardware peripheral 106 has a respective firewall 109, 110, 111, 112 coupled thereto. The firewalls 109-112 are configured to grant or deny access to the interconnect bus 108. For example, a software instruction of a software context executed by the CPU 101 seeking memory data stored in the memory module 102 is processed by the firewall 109 prior to the instruction being provided to the interconnect bus 108 to determine whether the instruction has the permission necessary to access the memory module 102 and/or the memory location of the memory module 102 where the target memory is stored.

Figure 2:
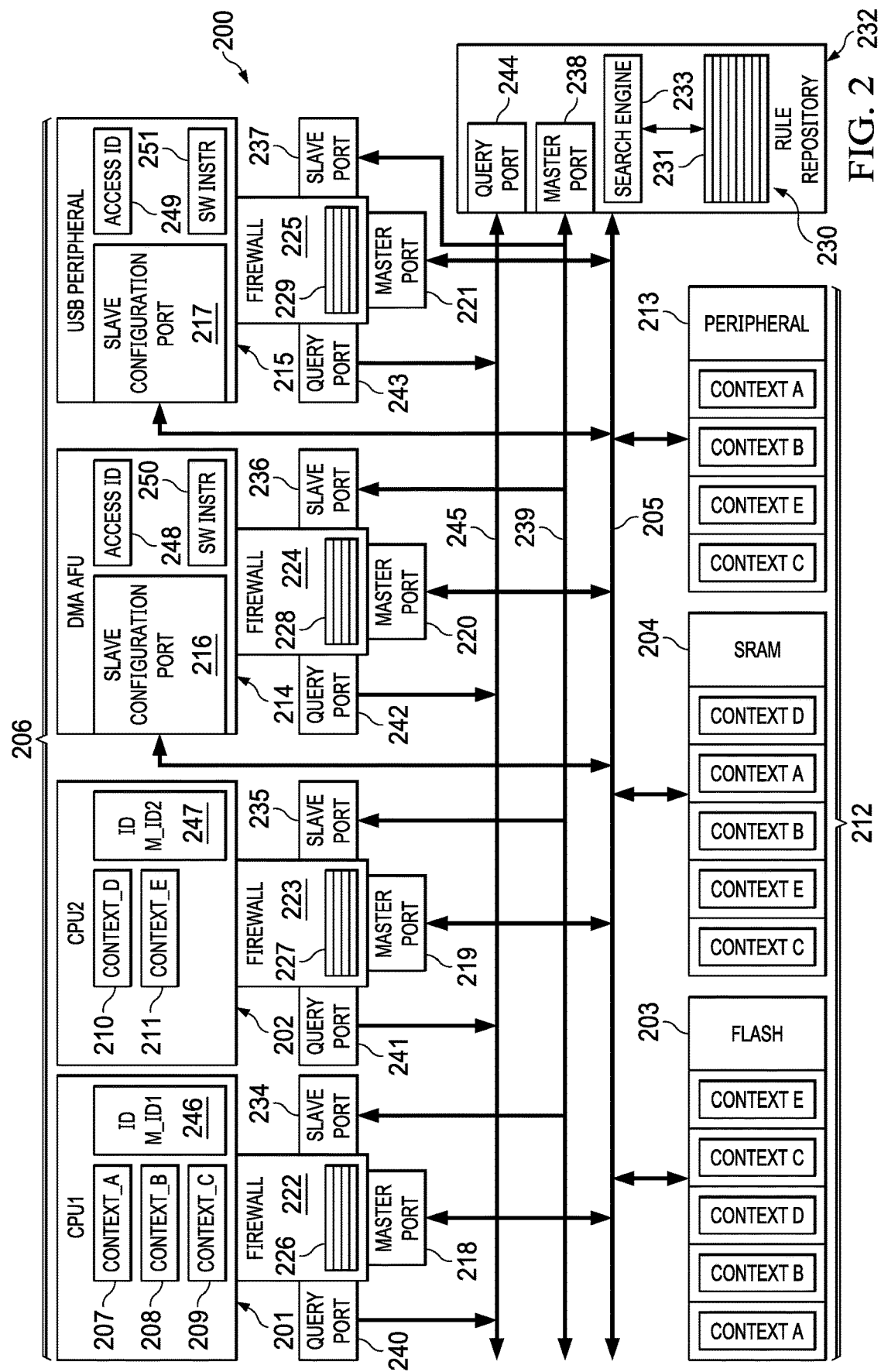
FIG. 2 is a block diagram of a microcontroller according to another aspect.

FIG. 2 illustrates a block diagram of a microcontroller 200 according to another example. The microcontroller 200 includes CPUs 201, 202 and memory module 203, 204 in communication with each other via an interconnect bus 205. The CPUs 201, 202 are master components 206 capable of executing instructions of one or more software contexts (e.g., illustrated software contexts 207-211) and initiating bus transactions intended for the interconnect bus 205 based on the instructions. While five software contexts 207-211 are illustrated as an example, the CPUs 201, 202 are configured to execute more or fewer software contexts as needed during the operation of the microcontroller 200 according to its design. The memory modules 203, 204 are examples of target or destination resources 212 subject to requests by the master components 206 to retrieve or store data. A non-master hardware peripheral device 213 is illustrated as an additional destination resource 212 that may be the target of the master components 206 while the peripheral 213 itself is not configured to initiate bus transactions. Examples of the non-master peripheral 213 include implementations of a universal asynchronous receiver/transmitter (UART), a serial peripheral interface (SPI), an analog-to-digital converter (ADC), and the like.

In addition to the CPUs 201, 202, additional components such as the illustrated direct memory access (DMA) accelerator functional unit (AFU) 214 and universal serial bus (USB) peripheral 215 may be included as master components 206. In general, an AFU may be included in the microcontroller 200 to offload computational operations for an application from a CPU such as the CPUs 201, 202 to increase system performance. The DMA AFU 214 is an example implementation of a hardware accelerator device that may be used to manage memory transfers. The USB peripheral 215 is an example of an intelligent hardware peripheral device capable of executing instructions and requesting access to target resources such as the memory modules 203, 204. The DMA AFU 214 and the USB peripheral 215 include respective slave configuration ports 216, 217 coupled to the interconnect bus 205 that allow the CPUs 201, 202 to communicate therewith to instruct the DMA AFU 214 or the USB peripheral 215 to execute one or more instructions. In this manner, the DMA AFU 214 and the USB peripheral 215 may be slave processing devices acting on behalf of master processing devices (e.g., the CPUs 201, 202).

The master components 206 include master ports 218-221 coupled to the interconnect bus 205 for transmitting software context instructions and/or initiated bus transactions thereto. Between each master component 206 and master port 218-221 is a respective firewall 222-225 configured to grant or deny access to the interconnect bus 205. Firewalls 222-225 include access rule storage 226-229 with one or more locations configured to store access rules defining access permission of the master components 206 to the target or destination resources 212. Each firewall 222-225 may be configured with a respective number of access rule storage locations based on independent design parameters for the overall application. As illustrated in the example of FIG. 2, the firewall 222 has four access rule storage locations in its access rule storage 226, the firewall 223 has three access rule storage locations in its access rule storage 227, the firewall 224 has four access rule storage locations in its access rule storage 228, and the firewall 225 has two access rule storage locations in its access rule storage 229. The number of access rule storage locations in a given access rule storage 226-229 of the firewalls 222-225 may be determined based on a tradeoff between a performance of the firewall 222-225 or of entire microcontroller 200 and an area of the real estate occupied by the access rule storage 226-229 on the microcontroller substrate.

When isolation is desired between different software contexts 207-211 and/or between different master components 206, the allowance and denial of access of the software contexts 207-211 or of the master components 206 to certain locations of the destination resources 212 by the firewalls 222-225 can ensure, for example, that access to a given location of a given destination resource 212 is allowed for one software context while being denied to all other software contexts. Accordingly, the access rules stored in the access rule storage 226-229 define such access permission approval or denial.

The firewalls 222-225 are configured as cached firewalls where the respective access rule storages 226-229 permit the interchange of access rules stored therein. That is, the access rules stored in the access rule storage locations of the access rule storages 226-229 may be substituted for alternative rules. For example, as explained below, if the access rules stored in the access rule storage 226 of the firewall 222 do not address or relate to the initiated bus transaction or instruction seeking access to the interconnect bus 205, a different rule that does address the bus transaction or instruction may be stored in the access rule storage 226 either in an empty access rule storage location or as a replacement for an existing access rule stored therein. Since the firewalls 222-225 implement a cached configuration, the firewalls 222-225 can avoid storing all possible access rules whether the access rules are used or not. Instead, a smaller number of access rule storage locations storing active rules can increase efficiency and reduce the size of the access rule storages 226-229 on the microcontroller substrate. When a previously-active access rule is no longer active, it can be replaced by a currently-active access rule.

A list of master access rules 230 is stored in an access rule storage 231 of a central rule repository 232. The access rules stored in the access rule storage 231 define access permissions to the destination resources 212 by the master components 206. In one example, the master access rules 230 define the allowance or denial of every destination resource location for each combination of software context instruction executed by each master component 206. However, the master access rules 230 may include fewer rules and may omit rules defining the permission of destination resource locations not sought by particular CPU/software context instruction combinations, for example.

The central rule repository 232 includes a search engine 233 coupled to the access rule storage 231 configured to search for a stored master access rule 230 matching a set of search parameters. If found, the corresponding master access rule 230 may be retrieved by the search engine 233 for processing as described herein.

As illustrated, firewalls 222-225 further include respective slave ports 234-237 coupled to a master port 238 of the central rule repository 232 via a rule bus 239. Additionally, respective query ports 240-243 of the firewalls 222-225 are coupled to a query port 244 of the central rule repository 232 via a query bus 245.

Figure 3:
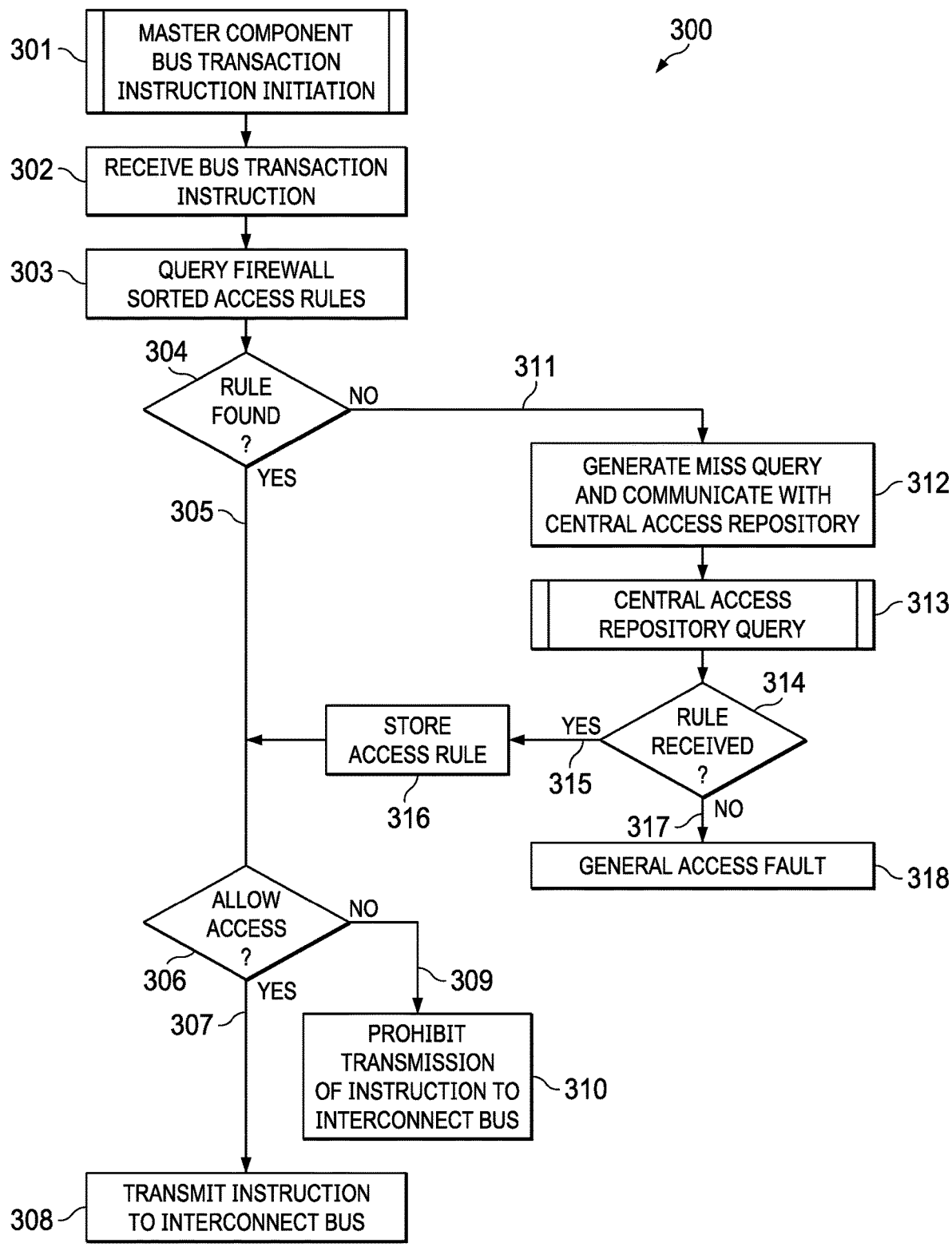
FIG. 3 is a flowchart describing an example process for applying an access rule to an instruction according to an aspect.
Figure 4:
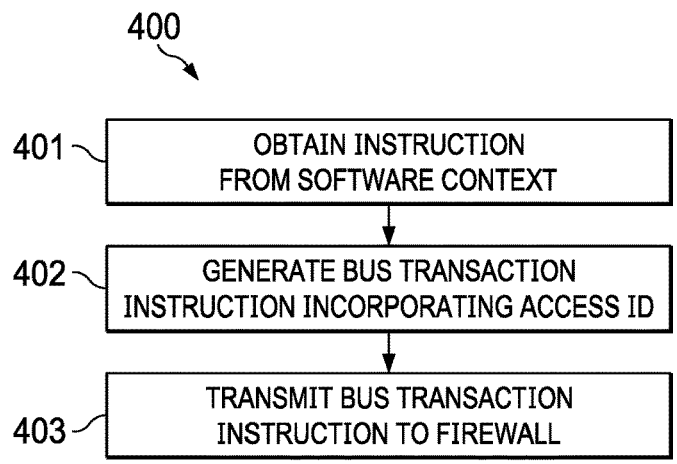
FIG. 4 is a flowchart describing an example process for generating and transmitting a bus transaction instruction according to an aspect.

FIG. 3 illustrates an example process 300 for applying an access rule to an instruction according to an aspect. Referring to FIGS. 2 and 3, operation of the microcontroller 200 to grant or deny access to the destination resources 212 by the master components 107 will be described. In step 301, a master component 206 initiates a bus transaction procedure and delivers the bus transaction instruction to the corresponding firewall. FIG. 4 illustrates steps of an illustrative bus transaction procedure 400 for a CPU master component 206 such as CPUs 201, 202. At step 401, an instruction is obtained from a software context being executed by the CPU 201, 202. As illustrated in FIG. 2, the CPUs 201, 202 are capable of processing multiple software contexts. For example, the CPU 201 may have the software contexts 207, 208, 209 loaded therein while the CPU 202 has the software contexts 210, 211 loaded therein. When executing step 401, the CPU 201 may obtain a next instruction from any of the software contexts 207, 208, 209, and the CPU 202 may obtain a next instruction from any of the software contexts 210, 211. The respective software contexts 207-211 in the CPUs 201, 202 may change during operation of the microcontroller 200 as needed. The CPU 201 may, for example, finish execution of the software context 207 and may load another software context to perform different software functions. The operation of the process described herein for applying access rules to software context instructions may apply to any software context executed by the master components 206.

Figure 5:
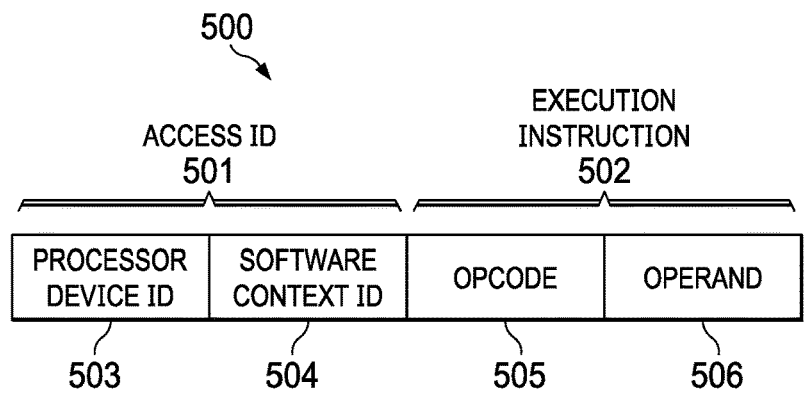
FIG. 5 is a block diagram of a bus transaction instruction according to an aspect.

The CPUs 201, 202 have processing device identifications (IDs) 246, 247 stored therein uniquely identifying the CPUs 201, 202. At step 402 of the bus transaction procedure 400, the CPU master component 206 generates a bus transaction instruction that incorporates an access ID. Referring to FIG. 5, a block diagram of an illustrative bus transaction instruction 500 is illustrated. The instruction 500 includes at least a portion identifying an access ID 501 and an execution instruction 502. The access ID 501 includes a processor device ID 503 configured to identify the CPU 201, 202 initiating the bus transaction instruction and a software context ID 504 configured to identify the identity of the software context (e.g., software contexts 207-211) from which the execution instruction 502 originated. The generation of the access ID 501 by the CPU 201 executing an instruction from the software context 207 may, for example, set the processor device ID 503 as "M_ID1" based on the device ID 246 and set the software context ID 504 as "CONTEXT_A". The execution instruction 502 includes the operation code (opcode) 505 and operand 506 for the current software context instruction to be initiated on the interconnect bus 205. The opcode 505 identifies the operation to be performed, and the operand 506 includes the data to be processed. The operand 506 identifies a target or destination resource 212 or a location thereon for the operation to be performed. Referring back to FIG. 4, the generated bus transaction instruction is transmitted, at step 403, to the process 300 for processing.

Figure 6:
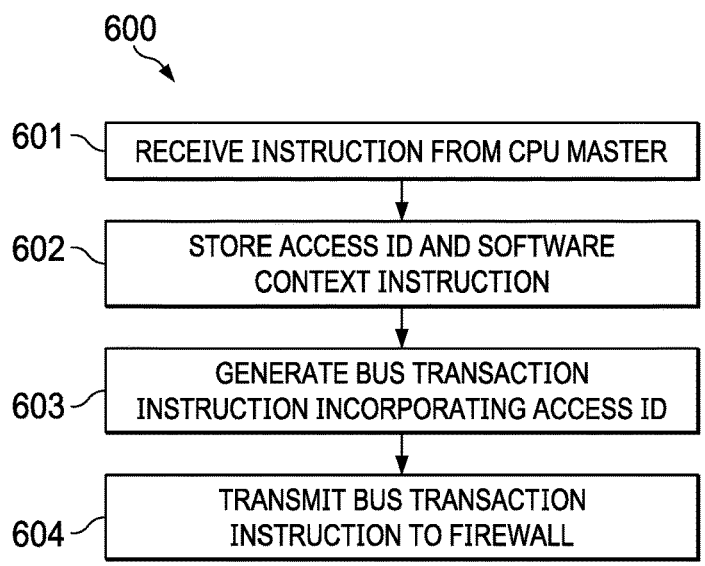
FIG. 6 is a flowchart describing an example process for generating and transmitting a bus transaction instruction according to another aspect.

FIG. 6 illustrates steps of an illustrative bus transaction procedure 600 executable by a non-CPU master 206 such as the DMA AFU 214 or the USB peripheral 215. These non-CPU master components 206, as described herein, may receive instructions from the CPU master components 206 for executing software context instructions on behalf of the CPU master components 206. The bus transaction procedure 600 includes receiving, at step 601, an instruction (e.g., instruction 500) from CPU 201 or CPU 202 via the respective slave configuration port 216, 217. The instruction 500 includes the processor device ID 503 of the sending CPU as well as the software context ID 504 of the current software context 207-211. The DMA AFU 214 and the USB peripheral 215 include respective access ID storage locations 248, 249 and respective software context storage locations 250, 251 for storing the received access ID 501 and execution instruction 502 at step 602. Alternatively, the instruction 500 may be stored in a single location. Storing the access ID 501 allows the non-CPU master component 206 to inherit the sending CPU's access ID 501. Thus, when acting on behalf of the sending CPU, the non-CPU master component 206 inherits the access permissions of the sending CPU. In this manner, the non-CPU master component 206 can be prevented from accessing target resource locations prohibited to the CPU master components 206. A bus transaction instruction incorporating the stored access ID 501 and the stored execution instruction 502 is generated at step 603 and is transmitted to the process 300 at step 604.

Figure 7:
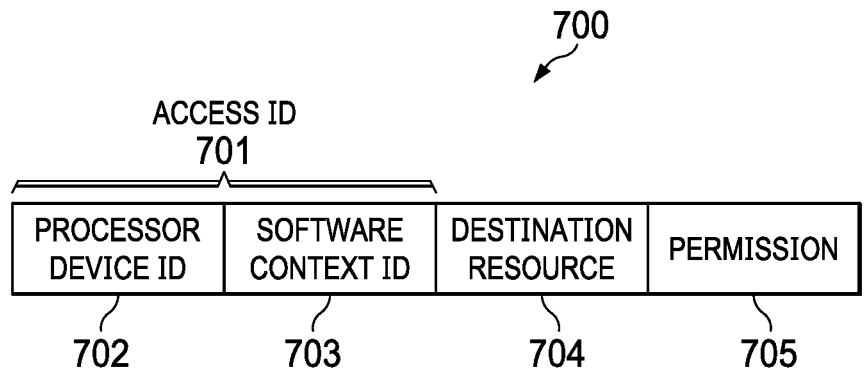
FIG. 7 is a block diagram of an access rule instruction according to an aspect.

Returning to FIG. 3, the process 300 receives a generated bus transaction instruction from bus transaction procedure 400 or 600 at step 302. In order to proceed on to the interconnect bus 205 and thus on to the destination resource 212, the bus transaction instruction is checked to verify if access permission is allowed. At step 303, the internal access rule storage (e.g., access rule storage 226-229) of a firewall is queried to determine if an access rule stored therein relates to the access ID of the bus transaction instruction. FIG. 7 illustrates a block diagram of an illustrative access rule 700 configured to verify the access permission for the bus transaction instruction. The access rule 700 includes an access ID portion 701 identifying a processor device ID 702 and a software context ID 703. The access rule 700 also includes a destination resource portion 704 for the identification of a destination resource 212 or a destination resource location (e.g., a memory location of a destination resource 212) for a specific combination of processor device ID 702 and software context ID 703. In one example, the destination resource portion 704 may identify a plurality of destination resources 212 accessible by the combination of processor device ID 702 and software context ID 703 in a single access rule 700. A permission portion 705 further identifies whether permission is allowed or denied for the specific combination of processor device ID 702 and software context ID 703 at the destination resource 212. For example, access rules may exist defining access allowance for software contexts 207-211 to respective locations of the memory modules 203, 204 and for software contexts 207-209 and 211 to respective locations of the peripheral 213. However, since software context 210 has no allocated access to peripheral 213 as illustrated in FIG. 2, one or more access rules denying access by the software context 210 to the peripheral 213 may be stored in the access rule storage 231.

It is contemplated that the access rules 700 stored in the access rule storage 231 of the central rule repository 232 actively address whether access permission is granted for the master components 206. That is, if access to a particular destination resource 212 is allowed or prohibited, a corresponding access rule 700 exists. In this manner, ambiguity due to the absence of any access rule 700 related to a particular combination of master component 206/destination resource 212 can be avoided. Thus, in a situation where no corresponding access rule is found in the firewall or in the central rule repository 232, a fault can be generated instead of leaving it up to the firewall to guess as to the access permission.

At step 304, the process 300 determines whether an access rule corresponding with the bus transaction instruction was found in the firewall internal access rule storage. If a rule was found (step 305), the process 300 determines at step 306 whether the access rule allows or denies access to the destination resource 212 by the master component 206 indicated in the bus transaction instruction. If permission is allowed or granted (step 307), the process 300 transmits the instruction to the interconnect bus 205 at step 308. Thereafter, the master component 206 and the destination resource 212 can interact with each other to complete the execution instruction 502. If permission is denied or prohibited (step 309), the process 300 prohibits transmission of the bus transaction instruction to the interconnect bus 205 and thus to the destination resource 212 at step 310 and may communicate the denial of permission back to the master component 206 for addressing the lack of permission.

Returning to step 304, if none of the stored access rules in the internal access rule storage of the firewall addresses the master component 206 and destination resource 212 contained in the bus transaction instruction (step 311), the process 300 generates a miss query and transmits the miss query with the central rule repository 232 at step 312. The process 300 may communicate the miss query with the central rule repository 232 via the query bus 245.

Figure 8:
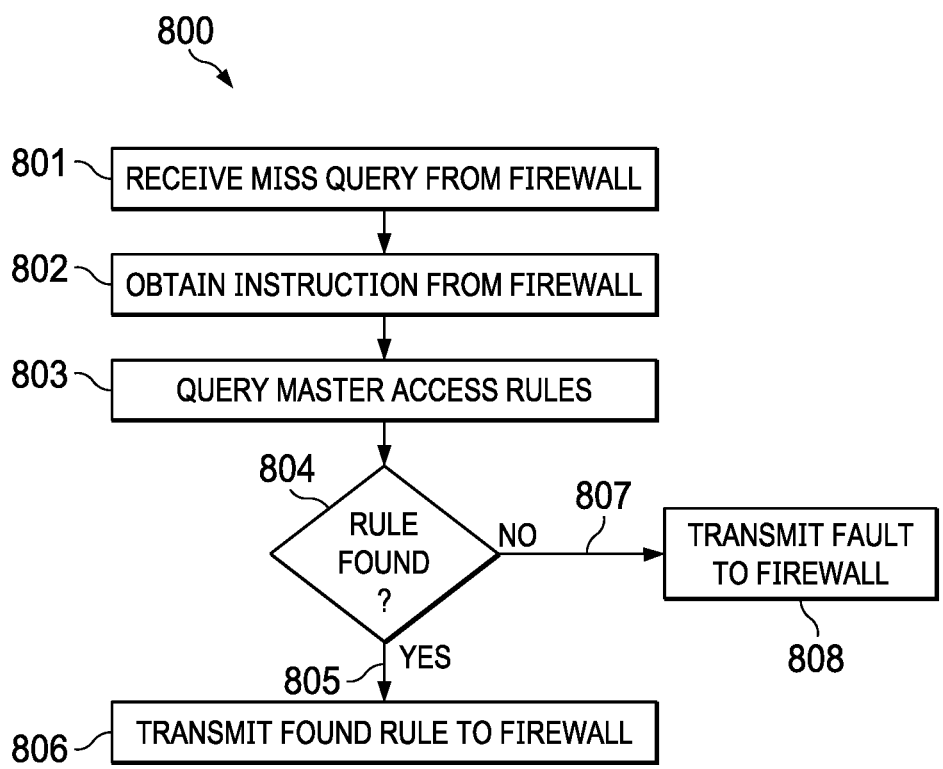
FIG. 8 is a flowchart describing an example process for querying a central access repository according to an aspect.

A central access repository query is processed at step 313 by the central rule repository 232 to determine if an access rule stored in the access rule storage 231 of the central rule repository 232 relates to the bus transaction instruction. FIG. 8 illustrates a central access repository query procedure 800 according to an example. At step 801, the central rule repository 232 receives the miss query via the query bus 245 and query port 244. The miss query may be an instruction having a plurality of data bits where the position of a bit indicates the firewall from which the miss query was generated. However, other implementations for the miss query are contemplated herein. Based on determining which firewall generated the miss query, the central rule repository 232 queries the respective firewall via the rule bus 239 at step 802 to acquire or obtain the bus transaction instruction for which no access rule was found in the firewall. The master access rules 230 stored in the access rule storage 231 of the central rule repository 232 are queried at step 803 to determine whether any of the master access rules 230 addresses or relates to the access ID and destination resource of the bus transaction instruction. At step 804, if an access rule corresponding with the bus transaction instruction is found (step 805) in the access rule storage 231, it is retrieved and transmitted to the corresponding firewall (e.g., via the query bus 245) at step 806.

As stated above, in one implementation, the existence of an access rule corresponding with the access ID and destination resource of the bus transaction instruction defines the permission, whether the access permission is to be allowed or denied. The absence of an access rule is a fault condition. Accordingly, if no access rule is found (step 807) in the access rule storage 231 at step 804 that relates or corresponds with the bus transaction instruction, the central rule repository 232 transmits a fault indicator to the process 300 at step 808. The fault indicator may indicate a data abort or bus access error condition.

Returning to FIG. 3, the process 300 determines, at step 314, if an access rule was received from the central rule repository 232. If an access rule was received (step 315), the process 300 stores the received access rule in the internal access rule storage of a corresponding firewall at step 316. If unused locations exist in the access rule storage, the process 300 may store the received access rule in an unused location. Alternatively, the process 300 may replace a previously-stored access rule with the received access rule. It may be that the previously-stored access rule is not currently active or has become stale such that it no longer applies to any of the software contexts currently being executed in the master component 206. In this case, its replacement by the received access rule substitutes an active or non-stale access rule into the access rule storage (e.g., access rule storage 226-229). In response to storing the received access rule (step 316), execution of the process 300 proceeds to step 306 and processing the allowance of the bus transaction instruction continues as described above.

If no access rule was received (step 317) from the central rule repository 232 at step 314 (e.g., such as when a fault indicator was received from the central rule repository 232), process 300 generates an access fault at step 318 for processing by the master component 206 responsible for the bus transaction instruction. The master component 206 may take appropriate action in response to either the access fault (step 318) or the denial of access (step 310).

In a multi-CPU arrangement as disclosed herein, isolation between accessible target resources can be a desirable feature during collaboration of the design and programming of the microcontroller among multiple teams. For instance, a first team designing the operation of a first CPU (e.g., CPU 201) may not want its operations visible or exposed to a second team designing the operation of a second CPU (e.g., CPU 202). Aspects of the disclosure provide such isolation to ensure that each software context component has access only to authorized memory regions or target resources. In this manner, the master components 206 can be mutually untrusted with each other. Further, inheritance by the non-master CPUs (e.g., AFUs 214 and peripherals 215) copies such isolation to these devices working on behalf of the master CPUs. While the number of storage locations in the access rule storages 226-229 of each respective firewall 222-225 may be fixed to respective sizes based on performance and size design parameters, the firewalls are yet capable of supporting a wide number of software components, leading to a scalable solution. Further, caching active access rules as needed provides a flexible solution for access rules defined with different attributes.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device comprising:
a central repository comprising rule repository memory configured to store one or more access rules defining access permission to one or more target resources;
a processing device configured to:
initiate a bus transaction associated with a destination resource based on an instruction; and
a firewall comprising firewall memory configured to store at least one access rule of the one or more access rules, the firewall configured to:
receive the bus transaction;
determine whether any access rule stored in the firewall memory defines access permission of the instruction to the destination resource; and
based on a determination that no access rule stored in the firewall memory defines the access permission of the instruction to the destination resource, generate a miss query condition to the central repository;
wherein the central repository is configured to:
in response to receiving the miss query condition, search the rule repository memory for an access rule of the one or more access rules defining the access permission of the instruction to the destination resource; and
based on the access rule being found, cause the access rule to be stored in the firewall memory.

2. The device of claim 1, wherein each access rule of the one or more access rules defines access permission of the instruction to at least one target resource of the one or more target resources based on an access identification comprising an identification of the processing device and an identification of a software context associated with the instruction.

3. The device of claim 2, wherein the processing device comprises a slave processing device, and
wherein the slave processing device is configured to:

receive the instruction from a master processing device;
receive an identification of the master processing device;
receive the identification of the software context; and
initiate the bus transaction based on the identification of the master processing device and the identification of the software context.

4. The device of claim 1, wherein the firewall is further configured to replace an existing access rule stored in the firewall memory with the access rule.

5. The device of claim 1, wherein, based on a determination that an access rule stored in the firewall memory defines the access permission of the instruction to the destination resource, the firewall is further configured to transmit the instruction to the destination resource.

6. The device of claim 5, wherein the destination resource corresponds to at least one target resource of the one or more target resources.

7. The device of claim 5, further comprising an interconnect bus coupled to the firewall and to the one or more target resources, wherein the firewall is further configured to transmit the instruction to the destination resource via the interconnect bus.

8. The device of claim 1, wherein, based on no access rule being found in the rule repository memory defining the access permission of the instruction to the destination resource, the central repository is further configured to instruct the firewall to fault access of the instruction to the destination resource.

9. The device of claim 1, wherein the destination resource comprises one of a hardware peripheral device or a computer memory device.

10. The device of claim 1, wherein the processing device comprises one of a central processing unit (CPU), a hardware accelerator device, or a hardware peripheral device.

11. A method comprising:
receiving an instruction at a firewall, the instruction identifying a destination resource;
querying an access rule storage of the firewall to determine if any access rule stored in the access rule storage defines access permission to the destination resource by the instruction; and
based on determining that no access rule stored in the access rule storage defines the access permission to the destination resource by the instruction,
causing searching of an access rule storage of a central rule repository to determine if an access rule stored in the access rule storage of the central rule repository defines the access permission to the destination resource by the instruction; and
based on the access rule being found in the access rule storage of the central rule repository, storing the access rule in the access rule storage of the firewall.

12. The method of claim 11, further comprising receiving an access identification at the firewall, the access identification comprising a processing device identification and a software context identification,
wherein querying the access rule storage comprises determining if any access rule stored in the access rule storage defines access permission to the destination resource by the instruction based on the access identification, and
wherein causing searching of the access rule storage comprises determining if any access rule stored in the access rule storage defines access to the destination resource by the instruction based on the access identification.

13. The method of claim 12, wherein receiving the instruction at the firewall comprises receiving the instruction from a central processing unit (CPU), and wherein the processing device identification comprises an identification of the CPU.

14. The method of claim 12 further comprising:
transmitting the instruction to a hardware accelerator device from a CPU;
transmitting a CPU identification of the CPU to the hardware accelerator device; and
inheriting the CPU identification at the hardware accelerator device.

15. The method of claim 14, wherein receiving the instruction at the firewall comprises receiving the instruction from the hardware accelerator device, and wherein the processing device identification comprises the inherited CPU identification.

16. The method of claim 11 further comprising transmitting the instruction to the destination resource based on the access rule granting access to the destination resource by the instruction.

17. The method of claim 16 further comprising prohibiting transmission of the instruction to the destination resource based on the access rule prohibiting access to the destination resource by the instruction.

18. The method of claim 16, wherein transmitting the instruction to the destination resource comprises transmitting the instruction to the destination resource via an interconnect bus coupled to the firewall and to the destination resource and wherein the method further comprises, based on determining that no access rule stored in the access rule storage of the firewall defines the access permission to the destination resource by the instruction, transmitting a miss query condition to the central rule repository via a query bus coupled to the firewall and to the access rule storage.

19. The method of claim 11 further comprising generating a fault based on no access rule that defines the access permission to the destination resource by the instruction being found in the access rule storage of the central rule repository.

20. The method of claim 11, wherein storing the access rule in the access rule storage of the firewall comprises replacing an existing access rule with the access rule in the access rule storage.

* * * * *